Jan. 2, 1945. A. VANG 2,366,162
REDUCTION OF THE SKIN FRICTION OF WATER BY VIBRATION
Filed Aug. 29, 1942
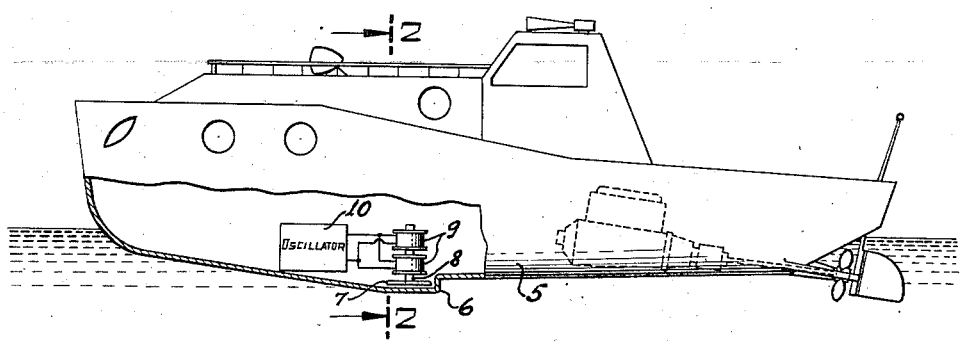
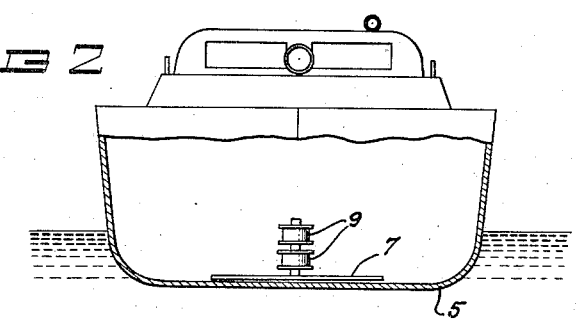
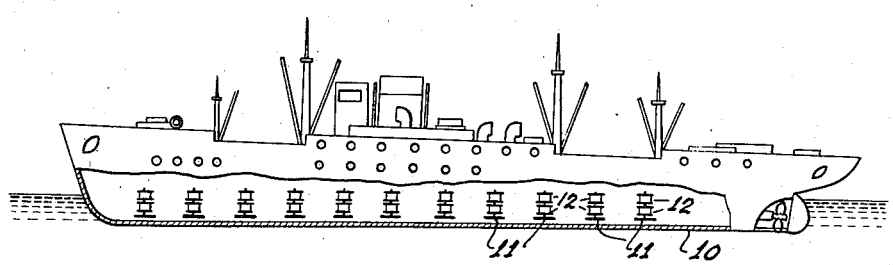
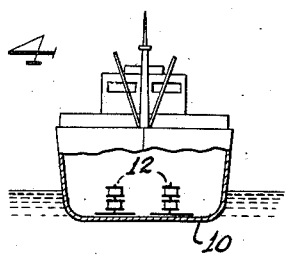
INVENTOR.
Alfred Vang.
BY Peter M. Boesen
ATTORNEY.

Patented Jan. 2, 1945

2,366,162

UNITED STATES PATENT OFFICE 2,366,162

REDUCTION OF THE SKIN FRICTION OF WATER BY VIBRATION

Alfred Vang, Newark, N. J., assignor of one-half to Stevenson, Jordan & Harrison, Inc., New York, N. Y., a corporation of New York Application August 29, 1942, Serial No. 456,653

4 Claims. (Cl. 114—67)

This invention relates to the reduction of the skin friction of water by vibration, and more particularly it refers to a method and means, whereby the speed of boats and ships may be increased by the reduction of the skin friction of same against the water, or, if desired, the same speed may be maintained with a smaller expenditure of power.

The theory underlying this invention is to be found in the fact that it changes the nature of the friction from one of sliding friction to one of rolling or bouncing friction as to be hereinafter fully described. The coefficient of sliding friction between two dry metals varies from .15 to .2 while the coefficient of rolling friction for the same metals may be .0197 or actually about one-tenth of the coefficient of the gliding friction. This is the well known reason for the fact that it is always easier to roll a load along on rollers or on wheels rather than slide the same on the surface. In the present invention, I am, therefore, eliminating the sliding friction and changing the same into a form of rolling friction, which I will hereinafter call "bouncing friction" because it is even better than rolling friction. To achieve this change in the friction of a boat or other marine vessel against the water I apply vibratory power that will be hereinafter described. By this means I break up the surface tension of the water and eliminate the sliding friction as above mentioned. At the same time, I also make the water molecules vibrate and bounce away from the surface of the boat or ship, and thereby I change the friction from the sliding type to a rolling or bouncing type.

It is well known that the skin friction of a marine vessel is proportional to the area wetted by the water. This factor is, therefore, a fixed one in relation to any given ship of a definite size. For a given tonnage the skin friction varies only slightly with the form and shape of the ship. It is, therefore, a factor which always has to be considered and which absorbs a great deal of the motive power extended to give the ship a certain speed. It will, therefore, be possible by reducing the skin friction to propel a ship at the same speed with a smaller expenditure of power, or it will be possible to obtain a higher amount of speed with the previously available amount of power. It is obvious, therefore, that this invention will be of considerable importance in the economic operation of marine vessels, inasmuch as it permits a better use of the propelling power and reduces the operating cost of the ship.

As mentioned supra, I eliminate the sliding friction of the water and the surface tension of the same by the application of forced vibrations to the area of the vessel, which is in contact with the water. These vibrations may be generated in several ways and should always be of a frequency that will give the greatest efficiency. By this is meant that the frequency should be as near to the natural frequency of the vibrating system as possible, because thereby the efficiency of the vibratory power would be greatly increased. It is obvious, of course, that in the case of a boat or a ship of a considerable size it will not always be possible to determine the exact natural or resonant frequency. It is possible, however, to determine a practical frequency at which the greatest amount of vibration will occur by the input of a minimum of power. Means for the determination are shown in the U. S. Patent No. 2,105,479. It must also be considered that the frequency should be high enough to have the desired effect upon the molecular structure of the water. To this end, it is usually found that the frequency should be in the so-called supersonic range. The action of the vibration on the water molecules can be better understood if each one of these is considered individually as a vibrating pendulum. The vibratory power will set these unit pendulums into a very strong forced vibration, and the individual water particles will vibrate with such intensity that they will bounce away from everything surrounding them. If we consider the film of water covering the wet surface of the vessel, the molecules of water composing this film will vibrate violently and will bounce against the side of the vessel and will rebound away from the same in an elastic fashion, just like a rubber ball would rebound from a wall. Due to the fact that each individual water particle is vibrating with a certain frequency, and also because it will strike the side of the vessel at only one point of its course, the time during which it is actually in contact with the side of the vessel will be only a very small fraction of the period of its vibration. It is obvious, therefore, that it is only during this very small fraction of a period that the water particle can exert what we have called a bouncing friction upon the side of the vessel. It is obvious also that this friction will be in the nature of a rolling friction rather than a sliding one.

In addition to the changing of the friction of the water against the side or bottom of the vessel, the application of vibratory power has other important results. One result which is highly important is the counteracting of the engine and propeller vibrations to which the vessel is subject. By analyzing these vibrations it may be possible to apply vibratory power of such a frequency or of such frequencies that these will counteract the forced vibrations caused by the engine and propeller, and thereby reduce the same and eliminate the well-known difficulties resulting from such engine and propeller vibrations. It is, of course, equally well possible to apply vibratory power of several frequencies and thereby beat these frequencies one against the other and thus to obtain the various kind of effects desired. A further beneficial effect of the application of vibratory power to the wetted surface of the vessel is to be found in the elimination of barnacles and marine growth on these surfaces. The intense supersonic vibration applied to the wetted surface will loosen any barnacles or other marine growth already there and will prevent new growth.

An important object of my invention is thus to provide a means for the reduction of the skin friction of marine vessels, whereby greater speed can be obtained using the same amount of power, or a sufficiently high speed maintained with less power.

Another object of my invention is to reduce the surface tension of the water nearest to the wetted surface of a vessel, and thereby changing the friction from a sliding one to a bouncing one.

A further object of my invention is to furnish a means for the prevention of the growth of barnacles and marine growth on the bottom of vessels.

Other objects and advantages of the invention will be apparent during the course of the following description:

In the accompanying drawing, forming a part of this specification, and in which like numerals are employed to designate similar parts throughout the same, Figure 1 is a sectional elevation of a motor boat embodying my invention.

Figure 2 is a section taken along the line 2—2 in Figure 1.

Figure 3 is a sectional elevation of a large vessel embodying my invention; while Figure 4 is a transverse section of the vessel shown in Figure 3.

In the drawing, wherein for the purpose of illustration is shown a preferred embodiment of my invention, the numeral 5 designates the hull of the boat illustrated in Figures 1 and 2. The bottom of the hull 5 has been offset as at 6, which has arranged a vibrating plate 7, carrying the vibration exciter 8 driven by the coils 9, which are operated by an electric current generated by an oscillator 10.

In Figures 3 and 4 are illustrated the application of my invention to a large vessel in which numerous vibration exciters are placed along the bottom of the vessel. The bottom of this vessel has been designated by numeral 10 along which vibrating membranes 11 are disposed. The vibration exciters 12 are shown placed upon the plate 11 in operable relation to the same. It is obvious, of course, that the vibration exciters 12 and the plates 11 may have to be larger and more substantial in the case of a large vessel, such as shown in Figures 3 and 4. For this reason and for the sake of illustration a number of vibration exciters have been shown in the bottom of the vessel 10. It is obvious, of course, that the drawing does not show the vibration exciters 12 and the plates 11 to the same scale as the ship, and the vibration apparatus has therefore been shown to a large scale for the sake of illustration.

The operation of my invention has been partly discussed above, but its essential features are as follows:

By suitable experiment, and by the use of variable frequency apparatus, I determine in advance the most suitable frequency for the application in every individual case. Reference may in this connection be had to the U. S. Patent 2,105,479, showing the determination of resonant frequency. I, then, design an oscillator and a vibration exciter to give a sufficient amount of power at the frequency selected. The vibration exciter is placed in such a position and fastened to the bottom of the hull in such a way that it will transmit to the hull the vibrations furnished by the vibration exciter. As soon as the ship is set in motion the oscillator is switched on and the vibration transmitter or exciter will transmit the vibrations furnished by the oscillator to the bottom of the hull. The forced vibrations of the hull will cause the water molecules to vibrate violently and to swing and bounce away from the hull as mentioned supra. Due to the pressure changes caused by the rapidly vibrating hull, the surface tension of the water in the film covering the hull will be greatly reduced, and the friction will be changed to a rolling or bouncing friction as mentioned supra.

It is to be understood that the form of my invention, herewith shown and described, is to be taken as a preferred example of the same and that various changes in the shape, size, and arrangement of parts may well be resorted to, without departing from the spirit of my invention, or the scope of the subjoined claims.

Having thus described my invention, I claim:

1. A method of reducing the skin friction of water on the immersed portions of a marine vessel, of the character described, consisting in the predetermination of the natural frequency of vibration of the area of the hull of said ship which is in contact with the water, and the application of vibratory power of said predetermined frequency to the wetted portion of the hull of the vessel for the elimination of the sliding friction and the breaking up of the surface tension of the water by such vibration, whereby the skin friction of the vessel with the contacting water is reduced.

2. A method of reducing the skin friction of water upon the immersed portions of a marine vessel, of the character described, consisting in the predetermination of the natural vibration frequency and the required amount of power to vibrate the immersed portion of the hull of said ship in relation to the wetting water; the application of vibratory power of said predetermined frequency and of sufficient energy for the elimination of the surface tension of the water by such vibration, whereby the sliding friction is changed to a rolling and bouncing friction.

3. A method for reducing the friction between the water and the wetted immersed portions of a marine vessel, said method comprising applying supersonic vibrations to said portions.

4. A method for reducing the friction between water and the immersed wetted portions of a marine vessel, said method comprising vibrating said portions substantially at the resonant frequencies thereof, whereby the portions vibrate at maximum amplitude for a given amount of power applied thereto.

ALFRED VANG.